United States Patent [19]

Garcia

[11] Patent Number: 5,151,995
[45] Date of Patent: Sep. 29, 1992

[54] METHOD AND APPARATUS FOR PRODUCING SUCCESSIVE CALCULATED RESULTS IN A HIGH-SPEED COMPUTER FUNCTIONAL UNIT USING LOW-SPEED VLSI COMPONENTS

[75] Inventor: Susan J. Garcia, Eau Claire, Wis.

[73] Assignee: Cray Research, Inc., Eagan, Minn.

[21] Appl. No.: 622,325

[22] Filed: Nov. 28, 1990

Related U.S. Application Data

[63] Continuation of Ser. No. 478,758, Feb. 12, 1990, abandoned, which is a continuation of Ser. No. 229,136, Aug. 5, 1988, abandoned.

[51] Int. Cl.⁵ .................. G06F 15/16; G06F 1/06
[52] U.S. Cl. .................. 395/800; 364/DIG. 1; 364/270.3; 364/231.8; 364/239.7
[58] Field of Search ... 364/200 MS File, 900 MS File; 307/465, 475, 480

[56] References Cited

U.S. PATENT DOCUMENTS

| 3,783,254 | 1/1974 | Eichelberger | 307/480 X |
| 3,900,723 | 8/1975 | Bethany et al. | 307/736 |
| 4,034,356 | 7/1977 | Howley et al. | 307/465 |
| 4,128,880 | 12/1978 | Cray | 364/200 |
| 4,506,341 | 3/1985 | Kalter et al. | 307/465 X |
| 4,575,794 | 3/1986 | Veneski et al. | 364/200 |
| 4,594,661 | 6/1986 | Moore et al. | 364/200 |
| 4,725,973 | 2/1988 | Matsuura et al. | 364/736 |
| 4,742,252 | 5/1988 | Agrawal | 307/465 |
| 4,761,754 | 8/1988 | Kinoshita | 364/200 |
| 4,809,171 | 2/1989 | Dozier et al. | 364/200 |

*Primary Examiner*—David L. Clark
*Attorney, Agent, or Firm*—Merchant, Gould, Smith, Edell, Welter & Schmidt

[57] ABSTRACT

A functional unit composed of parallel data processing paths implemented in relatively low speed digital logic. A data processing path is designed in a digital logic family of high integration but relatively low speed. The path is designed to be clocked by a data processing clock where the frequency of the data processing clock is substantially the system clock divided by the number of parallel implementations of the data processing path.

1 Claim, 2 Drawing Sheets

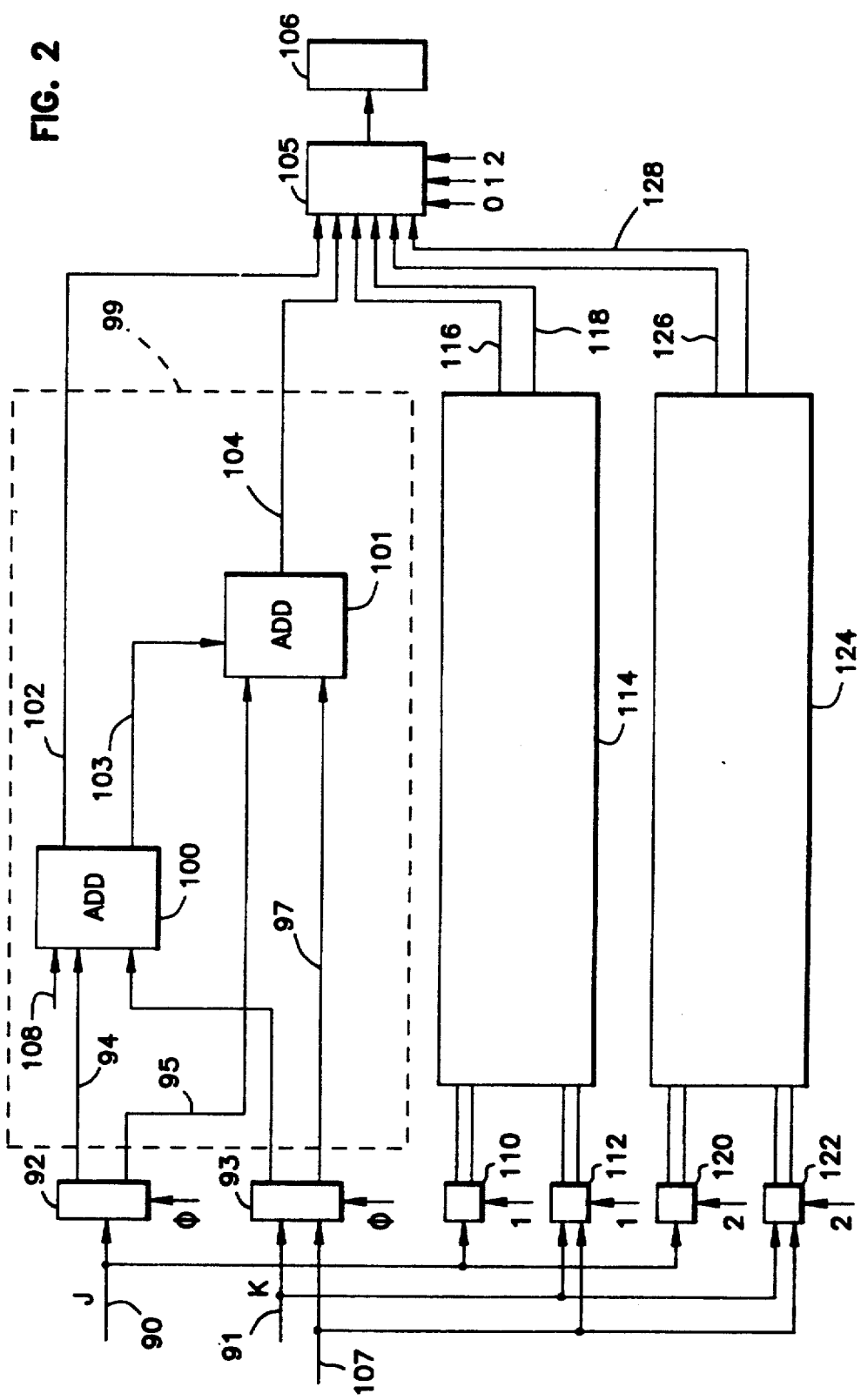

METHOD AND APPARATUS FOR PRODUCING SUCCESSIVE CALCULATED RESULTS IN A HIGH-SPEED COMPUTER FUNCTIONAL UNIT USING LOW-SPEED VLSI COMPONENTS

This is a continuation of application Ser. No. 07/478,758, filed Feb. 12, 1990, now abandoned, which is a continuation of application Ser. No. 07/229,136, filed Aug. 5, 1988, now abandoned.

FIELD OF THE INVENTION

This invention pertains to the field of high-performance computers, and particularly to improved high-performance functional units for vector processing computers.

BACKGROUND OF THE PRIOR ART

In the field of large, very high performance computers, usually referred to as supercomputers, a vector processing architecture is usually provided in order to achieve the very high data processing rates required for extremely computationally intensive applications such as modeling of physical phenomena. An example of a supercomputer vector processing architecture is disclosed in U.S. Pat. No. 4,128,880 by Seymour R. Cray, and assigned to Cray Research, Inc. In that architecture, a plurality of vector registers are used to hold the vectors for sending to a functional unit and for receiving and temporarily holding result vectors from functional units. For maximum speed individual vector elements are transmitted as operands from vector register to functional unit at the rate of one element per clock period, and individual result elements for the result vector are transmitted from the functional unit at the same rate. In this manner, once the start-up time or functional unit time has passed, the functional unit can provide successive results of successive operations for each clock period. Because the actual number of clock periods required to complete a single calculation is generally several clock periods, fully segmented functional unit designs are used. In a segmented design, all information arriving at the unit or moving within the unit is captured and held at the end of every clock period. Of course, the number of capture and hold operations for a given functional unit depends upon the type of unit, i.e., integer ADD, floating point, multiply, logical operations, etc., as well as the number of logic levels between latches. This is referred to as the functional unit time, and in general it is desirable to keep the functional unit time short not only because it affects the start-up time for beginning to produce results in a vector operation, but also because it has a significant effect on scalar operations. On the other hand, reducing the number of clock periods in the functional unit time might cause an increase in the number of levels of logic between successive latches, which in turn could dictate a slower clock time to allow for propagation and settling of signals. It is therefore necessary to achieve a balanced design between clock speed and functional unit time for the segmented functional unit.

The need for high-speed operation in supercomputers has usually resulted in designs wherein the critical components including functional units are implemented in small or medium scale emitter coupled logic (ECL) integrated circuits. Such devices are characterized by very high switching speed, high power consumption and heat dissipation, and moderate scale of integration. Very large scale integration (VLSI) gate arrays which have found widespread use in many computer applications offer the potential advantages of lower cost, higher density, and lower power dissipation, both of which are advantageous and which can translate into greater packing density in a supercomputer. This higher density allows the CPU to be physically smaller, which means faster interconnect paths and a faster overall computer, or it means more CPUs in the same machine, space to provide a more powerful system. However, functional unit design in logic devices such as VLSI gate arrays has been difficult due to the fact that the cumulative delay in propagating a signal through the device often is greater than that in an equivalent design implemented in medium scale logic. As a result, this makes them unacceptable for replacing medium scale logic in supercomputer functional units. Also, VLSI gate arrays which use sequential logic, i.e., which have latches on the chips, have problems due to transition time skew in attempting to run at supercomputer clock frequencies.

SUMMARY OF THE INVENTION

This invention provides a technique of using digital logic designs with propagation delays greater than a period of the system clock in segmented functional units in a high-speed supercomputer environment in a way which provides the advantages of compactness and low power dissipation of these designs, while preserving the speed of operation needed in a supercomputer. This is achieved by providing a plurality of data operating paths based on these designs through the functional unit, and means for coordination of the operation of the multiple paths so that the overall speed of operation can be maintained even though individual paths operate at a slower speed. By careful design the speed objectives can be maintained while still providing improvements in compact packaging space, power savings, and cost savings. Through the particular designs provided in this invention, only a few design types may be needed to implement multiple functional units.

BRIEF DESCRIPTION OF THE DRAWING

In the drawing,

FIG. 2 is a schematic block diagram of an integer ADD functional unit according to the invention.

DETAILED DESCRIPTION OF THE PREFERRED EMBODIMENT

Figure 1:
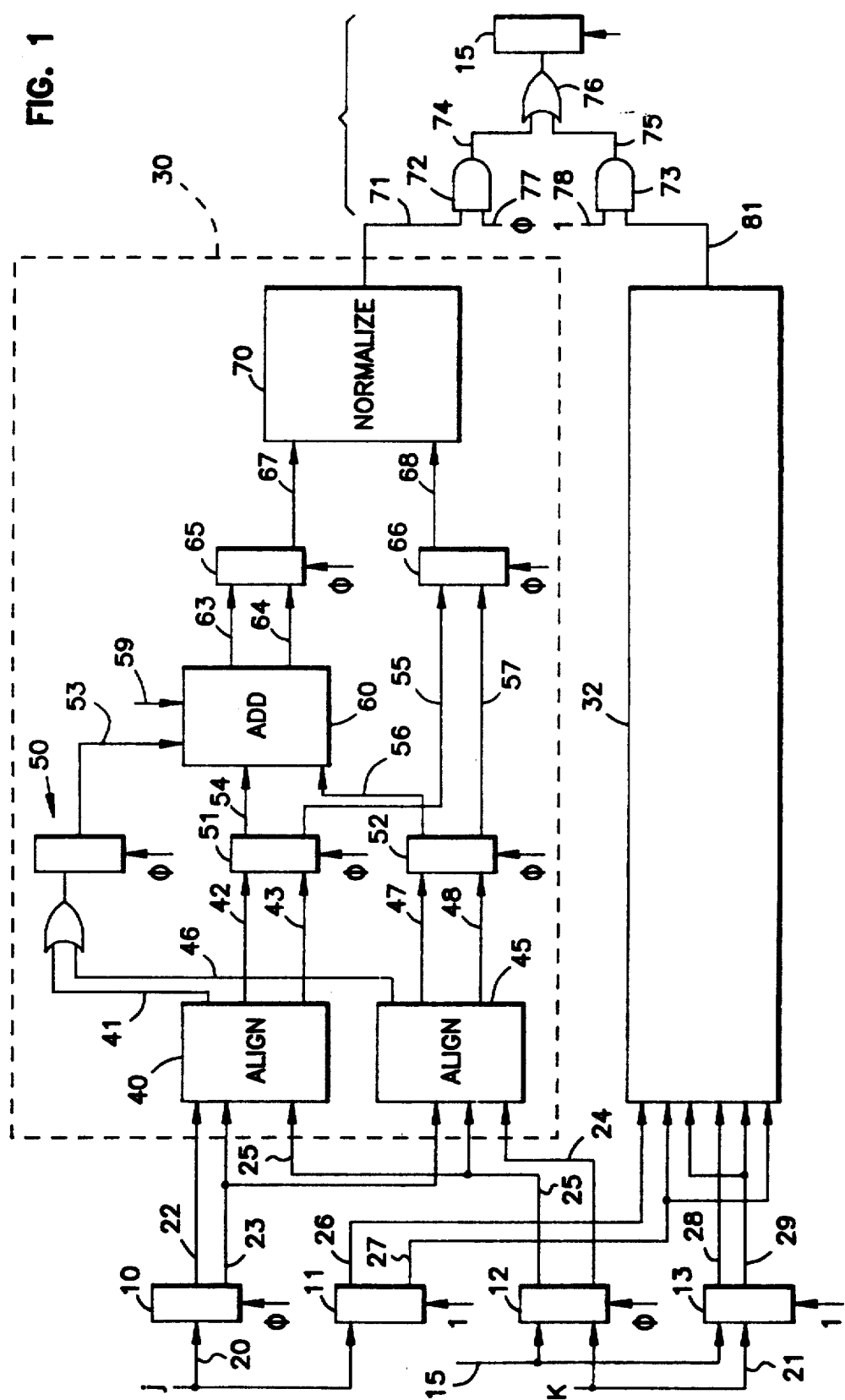
FIG. 1 is a block diagram of a floating point ADD functional unit according to the present invention.

The preferred embodiment of the invention is illustrated herein in the form of floating point and integer addition functional units. However, it will be understood that the principle of the invention can be applied equally well to other types of functional units. In the preferred embodiment of this invention, VLSI gate arrays are used to implement the designs. It should be apparent to those skilled in the art that other types of devices and other families of digital logic could be used to achieve equivalent results. Also, in the specification, the functional units described are arithmetic in nature. It should be apparent that the application of this invention is not restricted to arithmetic units but can be extended to any design that receives a set of inputs and produces a set of outputs based on those inputs.

FIG. 1 is a block diagram of a fully segmented floating point ADD functional unit in accordance with the present invention. In use, successive elements of vectors J, K are applied to the input latches 10-13 at one pair per clock cycle. After the functional unit time, results which are the floating point binary sums of pairs of individual elements J, K are delivered to latch 15 at one per clock cycle. Specifically elements of vector J are received on data path 20, a branch of which leads to latch 10 and another branch of which leads to latch 11. Although data paths in FIG. 1 are indicated in single line, it will be appreciated that in actuality they are parallel data paths of width corresponding to the design of the computer. For example, in the preferred embodiment data path 20 is 64 bits wide, because the functional unit is designed for floating point addition of 64-bit numbers. Similarly, data path 21 branches to latches 12 and 13. Data paths 20 and 21 may be connected by circuitry (not shown) to receive vector elements from vector registers generally of the type described in the above-mentioned U.S. Pat. No. 4,128,880.

Although operands, i.e., individual vector elements, are delivered on data paths 20 and 21 at each clock period, the input latches operate on alternate clock periods. For the embodiment of the invention in FIG. 1, the clock is divided by two to provide a half-frequency data processing clock of phases zero and one. Latches 10 and 12 operate on the same phase zero of the half-frequency, and latches 11 and 13 operate on phase one, which alternates with phase zero. This arrangement is used to direct alternate pairs of operands down two separate but identical computation paths. One path, indicated by dotted line 30, is shown in greater detail as described further below. The other path is indicated by reference number 32 and is substantially identical to computation path 30 and is therefore shown only in block form. Because the VLSI propagation delay associated with the embodiment of FIG. 1 is two system clock periods, two phases and two duplicate paths are used. In general, if the VLSI propagation delay is n system clock periods, then n phases and n paths are needed.

Computational path 30 includes four VLSI gate arrays 40, 45, 60 and 70, which are purely combinational, meaning that they have no latches. Purely combinational VLSI arrays have the advantages of simpler design, less power consumption, and greater capacity to hold logic because no space is needed for latches on the chip. In addition to the VLSI gate arrays, computational path 30 includes numerous latches for capturing and holding data at each clock period as it progresses through the computational path. Chips 40 and 45 are identical, so that there are three VLSI chip types. Through careful system design, one of these, VLSI chip 60, can also be used in the integer ADD functional unit of FIG. 2, thereby minimizing the number of different types of VLSI chips required.

In the preferred embodiment, operands are 64 bits wide, and in floating point form each operand is represented as a 48-bit coefficient with a 16-bit exponent. The 16-bit exponent includes one sign bit for the coefficient, and the other 15 bits are for the exponent and its sign. Latches 12 and 13 also receive an add mode control signal on lead 15. This signal, which comes from other control circuitry (not shown) within the computer indicates whether addition or subtraction is to be performed. If a subtraction is to be performed, circuits 12 and 13 change the sign bit for the coefficient of that operand. If addition is to be performed, this step is not done.

The coefficient portion of an operand held at latch 10 is transmitted by data path 22 to chip 40, and the exponent bits are transmitted on data path 23 to chip 40 and also to chip 45. In similar manner, the coefficient bits of the operand from latch 12 are transmitted on data path 24 to chip 45, and the exponent bits (including the changed sign bit for the coefficient if subtraction is to be done) are transmitted on data path 25 to both chips 45 and 40.

Chips 40 and 45 are designed for exponent selection and coefficient alignment functions as steps preparatory to the actual addition. These and the other VLSI circuits can be fabricated through known techniques for large gate arrays, with a metalizing or interconnect layer designed according to the logic function or functions to be performed. In the case of chips 40 and 45, this involves checking the signs of the J and K operands and, if different, 2's complementing the larger, and in any case shifting (aligning) the smaller number so that the coefficients can subsequently be added. In the preferred embodiment, the 2's complementing is actually implemented by 1's complementing the larger coefficient in circuit 40 or 45 and applying a carry-in bit to input 59 of add circuit 60.

From alignment circuit 40, the 48-bit coefficient is transmitted over path 42 to latch 51, and 8 bits of exponent are transmitted on data path 43. Similarly, 48 bits of the K operand coefficient are transmitted from chip 45 to latch 52 on data path 47, and 8 bits of coefficient are transmitted on data path 48. Each of chips 40 and 45 have a round bit output, and these connect over leads 41, 46, respectively, to an OR gate input of latch 50.

Latches 50, 51 and 52 are clocked to capture and hold information according to the standard practice for segmented functional units, at the occurrence of the same phase of the half-frequency clock as latches 10 and 12. The 48-bit J operand coefficient is transmitted from latch 51 to ADD chip 60 via data path 54, and the coefficient of the K operand is similarly applied to ADD circuit 60 via data path 56. The 8 exponent bits from each of latches 51 and 52 are transmitted on data paths 55, 57, respectively, to latch 66, which captures and holds them during the cycle while coefficients are being added at ADD circuit 60. The round bit, if any, from latch 50 is applied by lead 53 to the round input of chip 60.

ADD circuit 60 is a purely combinational VLSI gate array with logic connections formed thereon for integer adding of the two 48-bit operands applied thereto plus round bit on path 53 and the carry-in bit, if any, from circuits 40 or 45 to provide a 48-bit output integer on data path 63, plus a carry-out bit on lead 64. Note that the round bit is caused by shifting one operand down during alignment so there will never be a 50th bit at this point. These 49 bits are received at latch 65 and held when clocked by the half-frequency clock, then are applied via lead 67 to Normalize circuit 70. Meanwhile, the 16 exponent bits are clocked from latch 66 via path 68 to Normalize circuit 70.

Normalize circuit 70 is another VLSI gate array, with a logic connect layer designed for normalizing the result number by shifting off leading zeroes of the coefficient and subtracting that shift count from the exponent. The coefficient is also converted from 2's complement back to signed magnitude for floating point format. The normalized 64-bit result, which is the sum of a pair of elements J, K originally applied to the circuit several clock periods previously, is conveyed over data path 71 and select logic eventually to latch 15.

As previously mentioned, pairs of operands J and K are delivered to computation paths 30 and 32, respectively, on alternate phases of the half-frequency clock. The latches within computation path 32 operate on the opposite phase of the half-frequency clock as their counterparts in computation path 30. Results are delivered from their outputs via leads 71, 81 and are clocked at the corresponding time interval into latch 15 by gates 72, 73 which are controlled by phase zero and phase one clock signals applied to leads 77, 78, respectively. Elements 72-76 may be formed as integral parts of latch 15.

In this manner, relatively slower VLSI circuits can be used in a functional unit that can operate at the required high throughput rate to keep up with the clock cycle of the supercomputer, while still achieving some reduction in space and power requirements and cost.

FIG. 2 illustrates an integer ADD functional unit according to the present invention, which operates to add pairs of integer elements J, K presented at data paths 90, 91, respectively, and produces results at latch 106. According to one feature of the invention, ADD VLSI circuits 100, 101 can be identical to ADD circuit 60 from FIG. 1, thus simplifying and minimizing the part count for the computer.

The integer ADD unit of FIG. 2 uses three identical computation paths 99, 114, and 124, and latches which operate on three successive phases of one-third the system clock frequency, in order to provide overall computational speed comparable to emitter couple logic which it replaces. A system clock signal divided by three, into three successive phases zero, one and two is provided for purposes of the integer ADD circuitry of FIG. 2. Pairs of operands J, K to be added are received over data paths 90, 91 from vector registers or other functional units (not shown), and are applied to a series of latches. Data path 90 connects to latches 92, 110 and 120. Similarly, data path 91 connects to latches 93, 112 and 122. Latches 92 and 93 are associated with computational path 99, and operate on the phase zero portion of the one-third system clock frequency. Latches 110 and 112 are associated with computational path 114 and operate on the phase one portion of that signal, and latches 120 and 122 are associated with computational path 124, and operate on the phase two portion of the signal.

Pairs of operands to be added are held at registers 92, 93 temporarily during the phase zero portion of the cycle. The 16 least significant bits of the operands J, K are transmitted over data paths 94, 96 to ADD circuit 100. The 48 most significant bits of each of the operands J, K are transmitted over data paths 95, 97, respectively to ADD unit 101. The sum of the 16 pairs of bits applied to ADD unit 100 is produced within the unit and output bits 0 through 15 are conveyed over data path 102 to become the least significant 16 bits of the result. Bit 16 serves as the carry-out bit from unit 100 and is conveyed over lead 103 to the carry-in bit for ADD unit 101. In the application of circuit 100, the input bits 16 through 47, and output bits 17 through 47 and the normal carry-out bit are not used.

ADD circuit 101 produces the sum of the most significant bits of the operand plus the carry-in bit, and the resulting 48 bits are transmitted over data path 104 to become the most significant 48 bits of the 64 bit result integer. The bits on data path 102 and 104 are selected by three input multiplexer 105, during the corresponding phase for computation path 99 and are transmitted to latch 106, where they become available for transmission to vector registers or other functional units (not shown) of the computer.

The round bits for circuit 100 and 101 are not used in this application, so those inputs are held at a logic zero.

For subtraction a mode signal applied at lead 107 causes the latch 93 to change the sign bit for the element. Line 107 also branches to perform the same function for latches 112 and 122 for the other two computational paths. When the integers to be added are of opposite sign, 1's complementing and a carry-in bit to carry-in input 108 of circuit 100 is provided.

The operation of data paths 112 and 124 are the same as for data path 99 described above, except that the corresponding input latches 110, 112 or 120, 122, and the output multiplexer 104 operate on the appropriate phases of the one-third system clock frequency so that data paths 99, 114 and 124 take and process the incoming pairs of operands in sequential order.

Since the ADD function of circuit 101 is dependent upon receiving the carry-out from circuit 100 as the carry-in to circuit 101, these functions become the critical paths for achieving minimum functional unit time. It is therefore preferable in laying out the logic of the VLSI gate arrays for the ADD circuits to make preferentially short, relatively straight paths for the carry-out and carry-in functions so that overall fast operation can be achieved.

While the invention has been described in terms of floating point ADD and integer ADD functional units, it will be appreciated that the principle of the invention can be applied to other types of functional units, both arithmetic and logical. Accordingly, the invention has provided improved segmented functional units for supercomputers taking advantages of the greater compactness, lower power consumption and lower cost of VLSI gate array circuits, while overcoming the speed disadvantage thereof through the provision of multiple paths and coordination for the flow of information through the multiple paths to achieve the required operating speed.

What is claimed is:

1. A multipath functional unit for a computer operative for producing successive calculated results at the frequency of the system clock of the computer, comprising:

a system clock having a fixed frequency and having a single phase;

n path clocks each having a frequency which is equal to the frequency of the system clock of the computer divided by n and each path clock having a different phase;

n substantially identical data processing paths within a single functional unit for performing operations on operands applied thereto, wherein each data processing path comprises:

at least one purely combinational logic block having a propogation delay greater than the period of the system clock;

at least one input data latch connected to said purely combinational logic block and which is clocked by one of said path clocks;

at least on output data latch connected to said purely combinational logic block and which is clocked by the same path clock which clocks said input data latch;

data input means connected to the input data latch of each of said n plurality of substantially identical data processing paths for receiving operands at the frequency of the system clock;

data output means connected to the output data latch of each of said plurality of substantially identical data processing paths for producing results at the frequency of the system clock; and each of said plurality of substantially identical data processing paths being clocked by a different path clock so as to send successive operands to different ones of said plurality of substantially identical data processing paths.

* * * * *

UNITED STATES PATENT AND TRADEMARK OFFICE
CERTIFICATE OF CORRECTION

PATENT NO. : 5,151,995

DATED : September 29, 1992

INVENTOR(S) : Susan J. Garcia

It is certified that error appears in the above-identified patent and that said Letters Patent is hereby corrected as shown below:

On title page,

In [54], "USING LOW-SPEED VLSI COMPONENTS" should be deleted from the title therefore.

In column 1, line 4, delete "USING LOW-SPEED VLSI COMPONENTS" from the title therefore.

In column 2, line 43, "DRAWING" should read --DRAWINGS--

In column 2, line 45, "drawing" should read --drawings--

In column 3, line 24, insert --system-- after the word "the" therefore.

In column 4, lines 8 and 9, "45 and 40" should be --40 and 45--

In column 6, line 60 of claim 1, "propogation" should read --propagation--

Signed and Sealed this

Twenty-sixth Day of October, 1993

Attest:

BRUCE LEHMAN

Attesting Officer     Commissioner of Patents and Trademarks